Patented July 14, 1942

2,289,808

UNITED STATES PATENT OFFICE 2,289,808

PRODUCTION OF ALCOHOL

Gerrish M. Severson, Atchison, Kans., Lee A. Underkofler, Ames, Iowa, and Lorin Schoene, Milan, Mo., assignors to The Chemical Foundation, Incorporated, a corporation of Delaware No Drawing. Application July 27, 1938, Serial No. 221,634

2 Claims. (Cl. 195—17)

This invention relates to the production of alcohol, and more particularly to an improved method of saccharifying starch to produce fermentable sugars and the subsequent fermentation of these sugars to produce ethyl alcohol.

In order to produce ethyl alcohol from starchy materials, such as grain, tubers, and the like, it is first necessary to convert the starch to fermentable sugars. This conversion or saccharification step comprises essentially the hydrolysis of the starch to certain specific sugars. To secure the theoretical yield, the starch should be completely converted to the fermentable sugars maltose and dextrose.

In the past, two general methods have been employed to effect this saccharification; in one the starch is hydrolyzed by means of a chemical catalyst, such as a mineral acid; in the other the starch is saccharified by means of a biological catalyst or enzyme, such as malt diastase.

While such saccharification theoretically may be effected by mineral acids, the yields of alcohol which ultimately are obtained by this method are quite low and are considerably less than those obtainable with diastatic preparations. For this reason, even after years of considerable experimentation, barley malt is still the most effective agent for commercial saccharification of starches in the production of ethyl alcohol.

In typical methods, using barley malt, the malt is added to the mash in the proportions of about 10 parts of ground barley malt to 100 parts of grain. The specific malting conditions vary considerably, but in a typical case the malting operation is carried out at about 60° C. for about 45 minutes, after which the mash is cooled to fermentation temperature, usually about 30° C. and is then pumped to the fermenting vessels where it is inoculated with yeast and allowed to ferment for about 3 days. This type of prior operation, utilizing the barley malt as the hydrolytic agent, results in the conversion of about 85% of the available carbohydrates of the grains to ethyl alcohol and carbon dioxide. The balance remains in the weak aqueous alcohol or beer in the form of dextrines which are not fermentable by yeast. This low conversion factor is a very important feature in the production of ethyl alcohol, particularly in view of the fact that the barley malt itself is a costly material and constitutes one of the most expensive materials employed in the process. Thus, in the ordinary practice of malting, one bushel of barley, or 48 pounds, yields only about 34 pounds of malt. The malting step itself is a relatively protracted and difficult procedure, involving special equipment.

As indicated above, while it is theoretically possible to convert starches to fermentable sugars by means of mineral acids, the alcohol yields secured when using this method of saccharification are quite low and considerably lower than those obtainable with barley malt.

It has now been found, as a result of considerable experimentation, that an improved saccharification of starches may be obtained and a commensurately greater alcohol yield secured by utilizing a special type of saccharification in which acid hydrolysis and enzymatic hydrolysis are carefully and sequentially correlated so as to insure optimum saccharification. As will be seen more fully hereinafter, the novel method thus presents the marked economy of permitting the use of a cheap mineral acid for, so to speak, the major amount of the hydrolysis and minimal quantities of the more expensive diastatic material for the completion of the saccharification reaction. The invention, in a word, then comprises the concept of the special sequential employment of mineral acids and diastatic material to secure optimum saccharification and maximum alcohol yields.

As noted above, it has been found that, on the average, alcohol yields obtained from a malt saccharified mash are 12% higher than those obtained from an acid saccharified mash, even when the acid saccharification is carried out under conditions which insure optimum yields of fermentable sugars. It is also a fact that the maximum ultimate alcohol yields do not necessarily coincide with the maximum reducing sugar yields in an acid saccharified mash. The reason why an acid saccharified mash should give such relatively low yields of alcohol are difficult of precise determination. It would appear that such low yields would be due to one of, or combination of, several factors, namely: incomplete conversion of starch to fermentable sugars; lack of yeast nutrients or growth stimulants, and the formation of secondary conversion products which have a toxic or inhibitive effect on the yeast.

In order to more clearly establish the rationale of the present invention, certain preliminary experiments were conducted to determine the most important factor or factors responsible for unsatisfactory alcohol yields from starch saccharified with acid and to devise improved methods for positively insuring a greater yield.

It would appear to be clear that, if the addition of diastatic material to acid hydrolyzed mashes should increase the ultimate alcohol yield, the probability of the presence of a toxic or inhibiting material in the mash would be minimized. Since, however, such diastatic material in general is also rich in yeast stimulants, the increased yields obtained by supplementing the acid hydrolysis with enzymatic hydrolysis might be due to the stimulants, rather than to the enzyme itself. However, diastase may readily be inactivated by heat and without materially affecting the common yeast simulants. Therefore, a comparison of yields of alcohol from acid hydrolyzed mashes to which equal quantities of the active and inactivated diastatic material is added would give a very positive indication as to the relative importance of the diastase and stimulants as factors in increasing the alcohol yield.

A series of experiments were carried out to determine this relative importance of the enzyme and the stimulants as factors in increasing the alcohol yield. These experiments are generally illustrated by the material in the following table. In this table the alcohol yield is expressed in per cent. of the theoretical conversion of total carbohydrates in the corn.

*Table I*

| Diastatic material added | Proportion of material, percent of corn | Alcohol yield, percent of theory | Increase in yield, percent |
|---|---|---|---|
| Control | 0 | 84.2 | |
| Malt | 5 | 86.7 | 2.97 |
| Moldy bran | 5 | 94.4 | 12.10 |
| Inactivated malt | 5 | 83.8 | −0.48 |
| Inactivated moldy bran | 5 | 84.5 | 0.36 |

It will be noted from an inspection of this table that the alcohol yield of the control fermentation was 84.2% of theoretical. The comparative tests were made, as shown, with ordinary barley malt, moldy bran, as prepared in the manner more particularly described in copending application Serial No. 221,663, filed July 27, 1938, inactivated barley malt and inactivated moldy bran. The malt and moldy bran were inactivated by heating for a fifteen minute period at 10 pounds per square inch steam pressure. It will be observed that the inactivated preparations had no substantial effect upon the alcohol yield. When using 5% of a barley malt, an increase of 2.97% in alcohol was secured, while when using moldy bran, an increase of 12.1% was obtained. The table also indicates that the high yield of alcohol obtained from the mash to which the moldy bran had been added, for all practical purposes, obviates the probability that the low yield from the control was due to toxic or inhibiting substances. It is also clear from the table that the modly bran is much more efficient than malt in completing the saccharification of the starch.

In view of these preliminary findings, intensive experiments were conducted to determine the best enzymatic hydrolytic supplements for mineral acids and the best proportions of these supplements to secure maximum alcohol yields.

In the experiments which were conducted, ground yellow corn was used in the preparation of the mashes. The total carbohydrate content of the corn meal was determined according to the official direct acid hydrolysis method of the Association of Official Agricultural Chemists. The reducing substances formed were determined by the Shaffer-Hartmann method (Journal Biol. Chem. 45, 365 (1921)). The Shaffer-Hartmann reagents were standardized against a sample of pure dextrose. After taking samples for analysis, the corn was stored in well stoppered bottles until used, a little carbon disulfide being introduced into each bottle to prevent growth of either animal or plant organisms.

In the samples, three diastatic materials were employed, namely, soy bean meal, a commercial barley malt and a moldy bran as prepared according to the method described in the copending application referred to and produced by growing a strain of *Aspergillus oryzae* (culture No. 1) on moistened wheat bran. In each of the experiments reported, the moldy bran and malt were ground before use. The soy bean meal was obtained by grinding fresh whole beans.

It was found that, in ordinary circumstances, maximum conversion or saccharification, using acid hydrolysis, could be secured by cooking the corn meal with 0.10 N hydrochloric acid at 25 pounds per square inch steam pressure for 2.5 hours. In these circumstances, when 20 grams of corn meal per 100 ml. of acid were used, substantially 92% of the starch is converted to reducing substances, calculated as dextrose. It was also found that the mash could be liquefied when using as much as 60 grams of corn per 100 ml. of acid, although in these circumstances only about 9% of the starch is converted into reducing sugars. The experiments recorded in the tables given hereinafter were made in the following manner. Into each 1000 ml. Erlenmeyer flask were placed 100 grams of corn meal and 600 ml. of 0.10 N hydrochloric acid and the mixture was cooked for 2½ hours at 25 pounds steam pressure. For each batch of mash prepared for a given series of fermentations, the determination of the reducing substances was made by the Shaffer-Hartmann method after cooking, and the results expressed as dextrose. After cooking, the pH of the mash in each flask was adjusted to pH 5.0, and the diastatic materials were added under conditions usually employed for diastatic saccharification, that is to say, the mashes in the test flasks were brought to a temperature of 55° C. and the indicated amounts of the diastatic materials, expressed as per cent. of corn in the mash, added. The contents of the flasks were mixed by shaking, and the temperature was maintained at 55° C. for 60 minutes with frequent agitation during this period.

After completion of the preparation of the mashes, the contents of the flasks were cooled to 30° C. and each inoculated with 50 ml. of an active yeast culture (*Saccharomyces cerevisiae*) growing in beer wort. After incubation for 3 days at 30° C. the final volume of the fermented mash in each flask was measured, a 300 ml. aliquot distilled into a 100 ml. volumetric flask and the specific gravity of the distillate determined by a Chainomatic Westphal balance, the alcohol concentration being read from an appropriate table. The experimental results given in the tables are expressed in per cent. of the theoretical conversion of total carbohydrate in the corn to alcohol. Since fermentation experiments are characterized by a considerable degree of uncertainty as to the reliability of the results, duplicate fermentations were carried out; the findings recorded herein are therefore the result of a duplicated or checked fermentation.

As indicated above, the preliminary experiments clearly indicated that the most important factor in securing high ultimate alcohol yield from an acid saccharified mash is a maximum hydrolysis of the starch to fermentable sugars. The preliminary experiments also indicated that greatly increased alcohol yields could be secured by supplementing the preliminary acid hydrolysis with a subsequent enzymatic hydrolysis. To determine the relative efficacy of the different diastatic materials, a series of experiments were conducted, utilizing these materials separately, that is to say, these materials were employed to supplement the optimum acid hydrolysis which previously had been obtained. The results of these experiments are indicated in Tables II, III and IV.

In Table II are recorded the results of experiments showing the influence of the addition of soy bean meal alone, and soy bean used conjointly with barley malt, on the alcohol yields from acid hydrolyzed corn mash. In Table III similarly is shown the effect of the addition of moldy bran, alone and with soy bean meal, upon a similar acid hydrolyzed corn mash. In Table IV is shown the influence of the addition of moldy bran and malt on the alcohol yields from the acid hydrolyzed mash.

*Table II*

| Malt, percent of corn | Soy bean meal, percent of corn | Alcohol yield, percent of theory | Increase in yield, percent |
| --- | --- | --- | --- |
| ¹0 | 0 | 72.5 | ---------- |
| 1 | 0 | 72.4 | -0.14 |
| 0 | 1 | 73.9 | 1.95 |
| 1 | 1 | 72.5 | 0.00 |
| 1 | 2 | 73.0 | 0.69 |
| 1 | 3 | 76.7 | 5.79 |
| 2 | 1 | 72.0 | -0.69 |
| 2 | 2 | 74.5 | 2.76 |
| 2 | 3 | 75.6 | 4.27 |

¹ Control.

*Table III*

| Moldy bran, percent of corn | Soy bean meal, percent of corn | Alcohol yield, percent of theory | Increase in yield, percent |
| --- | --- | --- | --- |
| ¹0 | 0 | 84.0 | ---------- |
| 1 | 0 | 87.1 | 4.04 |
| 2 | 0 | 88.6 | 5.99 |
| 3 | 0 | 89.8 | 7.55 |
| 5 | 0 | 92.4 | 10.92 |
| 0 | 3 | 87.8 | 4.95 |
| 1 | 1 | 90.9 | 8.99 |
| 2 | 1 | 90.5 | 8.46 |
| 3 | 1 | 90.7 | 8.72 |
| 1 | 2 | 90.7 | 8.72 |
| 2 | 2 | 91.2 | 9.38 |
| 3 | 2 | 91.3 | 9.50 |

¹ Control.

*Table IV*

| Moldy bran, percent of corn | Malt, percent of corn | Alcohol yield, percent of theory | Increase in yield, percent |
| --- | --- | --- | --- |
| 0 | 0 | 75.3 | ---------- |
| 2 | 0 | 82.5 | 9.37 |
| 3 | 0 | 82.9 | 9.90 |
| 5 | 0 | 82.9 | 9.90 |
| 0 | 2 | 78.0 | 3.52 |
| 2 | 1 | 83.0 | 10.02 |
| 3 | 1 | 82.2 | 8.98 |
| 5 | 1 | 82.5 | 9.37 |
| 2 | 2 | 81.2 | 7.69 |
| 3 | 2 | 82.6 | 9.50 |
| 5 | 2 | 82.7 | 9.64 |

It was found in a series of preliminary experiments that increases of soy bean meal or malt above substantially 3% of the corn not only did not increase the alcohol yield but actually decreased it, due probably to the introduction of contaminating microorganisms which are normally present on these substances and which are not destroyed by the treatment employed. Similarly, preliminary experiments indicated that moldy bran, prepared under pure culture conditions, did not show this decrease, but did show that there was no marked advantage in using over substantially 5%.

Reverting to Table II, it may be noted for purposes of correlation that the yield from the control was 82.7% of theoretical, based on dextrose in the mash, after cooking with acid. The recorded 72.5% yield of theoretical, as previously noted, is based on the total carbohydrate content of the corn. In Table III the yield of alcohol from the control, which is 84%, is, as noted above, based on the total carbohydrate. Based on dextrose in the mash, this yield in 88.5% of theoretical. In Table IV the yield from the control is 75.3%, based on the total carbohydrate, and 81.0% based on dextrose.

It will be observed from an inspection of Table II that the separate additions of soy bean meal and malt did not increase the yield appreciably, although the conjoint use of soy bean meal and malt with a relatively high soy bean-malt ratio did improve the yield somewhat.

It is quite apparent from a study of Tables III and IV that the addition of a moldy bran to a mash which has been saccharified to the optimum degree with acid has a very remarkable effect. Thus, as shown, additions of moldy bran progressively increase the alcohol yield and additions of 5% of this diastatic material gives substantially a 10% increase. The conjoint use of moldy bran and soy bean meal in different relative proportions in general increases the yield somewhat above the equivalent of moldy bran alone, although the yield obtained with 5% of moldy bran alone is higher than any moldy bran-soy bean combination.

The striking effect of the addition of moldy bran is again evidenced in the experiments recorded in Table IV. Here again moldy bran additions of the order of 5% gave substantially a 10% increase in yield. The combination of malt and moldy bran, generally considered, is no better than moldy bran alone, although of these combinations the higher ratios of the moldy bran to malt are quite effective.

It is thus quite clear that a most important factor which has militated against the utilization of cheap acid saccharification is the incomplete conversion of the starch to fermentable sugars and the commensurately low alcohol yield. However, as herein demonstrated, it is possible to advantageously correlate an optimum acid hydrolysis with a special enzymatic hydrolysis to secure yields which are greater than those obtainable with the expensive barley malt. It is also apparent in view of the different effects of soy bean diastase and malt diastase, on the one hand, and moldy bran, on the other, that there is a definite specificity of action which characterizes the moldy bran. The precise mechanism of this improved action is difficult to ascertain, but quite likely is due to a difference in the enzymatic complex present in that material as compared to that of soy bean and malt. The residual acid dextrins in the mash, after acid hydrolysis, seem to be more readily converted to fermentable sugars by the mold amylase than by the soy bean or malt amylase. The broadened or balanced enzymatic action of the moldy bran would appear to be further indicated by the fact that the addition of soy bean meal to less than the optimum of moldy bran shows an accelerating effect on alcohol yields.

When it is considered that barley malt ordinarily costs three times as much, per pound, as the grain used in the fermentation and that, as a general rule, such malt insures the conversion of only about 85% of the potentially available material to alcohol, it can readily be appreciated that such a malting has been a major contributing cause to the relatively high cost of alcohol. In sharp contradistinction to these earlier methods, the present invention involves the use of cheap mineral acids and cheap fungal amylases as the mashing materials and in a process in which greatly alcohol yields are insured. The moldy bran diastatic material described herein will be referred to in the claims as Taka-koji.

It will be understood that, while the specific illustrative examples of the invention given herein involve the use of a specific Taka-diastase (*Aspergillus oryzae*), the invention equally comprehends the utilization of any other similarly functioning amyloclastic molds. While preferred embodiments of the invention have been described, it is to be understood that these are given by way of exemplification and not limitation. The invention is conceived to reside broadly in the concept of producing alcohol by correlated sequential chemical and enzymatic hydrolysis and the fermentation of the resulting mash to produce alcohol yields of the high order indicated.

We claim:

1. In the process of producing alcohol by fermentation of fermentable sugars derived from amylaceous material, that improvement which comprises definitely saccharifying the amylaceous material with a mineral acid to secure substantially 90% conversion of the amylaceous material to reducing substances calculated as dextrose and then subjecting the resulting product to further saccharification with a malting material which includes soy bean meal and Taka-koji.

2. In the process of producing alcohol by fermentation of fermentable sugars derived from amylaceous material, that improvement which comprises definitely saccharifying the amylaceous material with a hydrochloric acid solution of substantially 0.10 N concentration for a period of time sufficient to insure conversion of substantially 90% of the starch to fermentable sugars and then mashing the resulting material at a temperature of substantially 55° C. with a malting material which includes soybean meal and Taka-koji.

GERRISH M. SEVERSON.
LEE A. UNDERKOFLER.
LORIN SCHOENE.